Nov. 8, 1932.  B. C. PLACE  1,887,426
SECURING SNAP FASTENER
Filed June 16, 1930
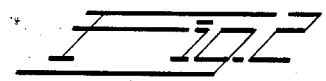
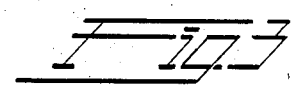
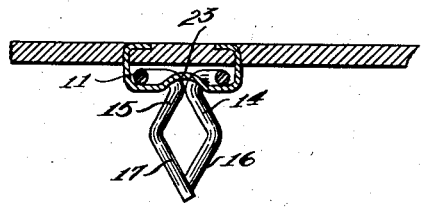
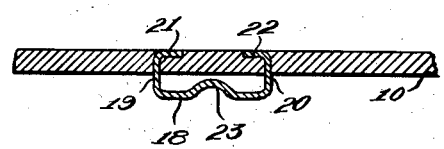
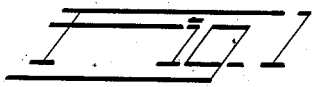
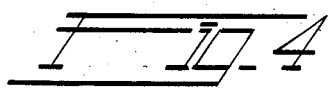
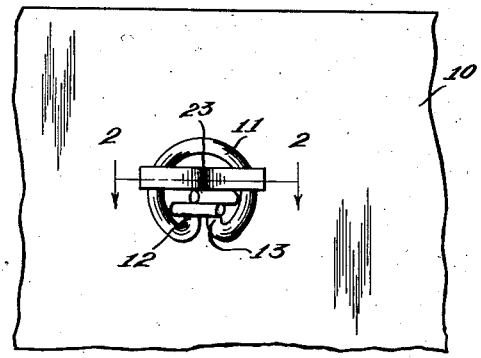
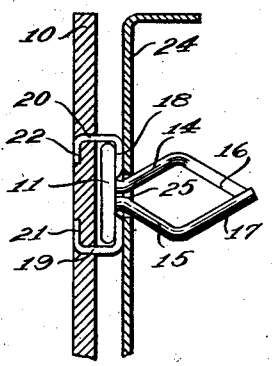
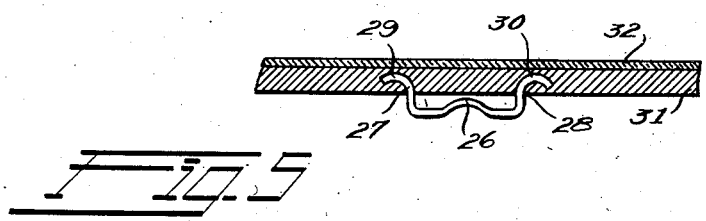
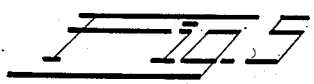
Inventor
Bion C. Place
By Strauch & Hoffman
Attorney Patented Nov. 8, 1932

1,887,426

UNITED STATES PATENT OFFICE

BION C. PLACE, OF DETROIT, MICHIGAN, ASSIGNOR OF ONE-HALF TO GEORGE E. GAGNIER, OF DETROIT, MICHIGAN

SECURING SNAP FASTENER

Application filed June 16, 1930. Serial No. 461,526.

This invention relates to a novel arrangement for securing snap fasteners to covering material or panels that are to be applied in position by snapping the fasteners in suitable sockets or openings provided to receive them.

More particularly, the invention relates to an arrangement for securing fasteners, to material that is to be attached thereby, in a manner so that the fastener can shift slightly laterally with respect to the securing means, so that it may be readily brought to register with a socket or opening, provided to receive it, which socket or opening may not be located precisely in alignment with the fastener proper.

For certain purposes, as for example, for securing trim or finish panels to the interior of automobile or similar bodies, it is desirable to utilize snap fasteners to attach said trim or finished material to the supporting structure which, in the case of automobile or similar bodies, may be the sides of the body or the doors forming a part thereof. Each panel or unit of finish or trim material intended for this purpose frequently embodies a relatively large number of fasteners disposed along the margins thereof at intervals. Such fasteners are brought into registry and snapped into engagement with the sides of suitable openings or perforations in the frame of the body. In practice, it is difficult to make the openings in the framework register exactly with the fasteners applied to the panels. Accordingly, when the panel is brought into position difficulty may be encountered in bringing the snap fasteners into operative position in the perforations or openings provided to receive them.

In order to obviate this objection fasteners have heretofore been proposed of a character that include specially formed and relatively complex fastener securing elements of such nature, that the securing elements hold the fastener proper in assembled relation with respect to the panels, though the fastener proper is capable of moving laterally in any direction to a limited degree. This enables the fasteners to be shifted slightly so that they may be brought into exact registry with the perforations or openings in the frame of the vehicle or similar constructions in applying the panels thereto.

Arrangements of this character heretofore proposed have generally been constructed of sheet metal, and are frequently of a relatively complex structure consisting of several parts made of sheet metal and subsequently separately applied to the material. These arrangements are not only relatively expensive to manufacture, but they require special machinery not only to separately form the parts, but to apply them to the panels, if the application is to be accomplished expeditiously.

A primary object of this invention is to simplify existing arrangements for securing fasteners to material by providing a fastener securing arrangement of extremely simple form, including elements capable of being formed and expeditiously applied to the material to secure the fasteners by means of a single machine.

A further object of the invention is to provide an arrangement for securing snap fasteners to material, including a staple modified in a simple manner to accomplish the results heretofore accomplished by specially formed sheet metal members.

A still further object of the invention is to provide a method of attaching fasteners to material in which the fastener securing element is of such form that the fastener may be readily assembled with respect to said element after the element has been permanently attached to the materials if desired.

A still further object of the invention is to provide a novel way of securing a fastener to material that does not require perforation of the material other than necessary to secure or embed the ends of the fastener securing element in said material.

A still further object of the invention is to provide an arrangement of securing fasteners to material by the use of staples that do not completely penetrate the materials, but are nevertheless firmly attached thereto without such penetration.

Further objects of the invention will appear as a description thereof proceeds with reference to the accompanying drawing, in which:

Figure 1 is a fragmentary rear view of covering material having a snap fastener attached thereto in accordance with this invention.

Figure 2 is a sectional view taken on the lines 2—2 of Figure 1, looking in the direction of the arrows.

Figure 3 is a sectional view through a portion of the covering material showing the staple in position before application of the fastener.

Figure 4 is a fragmentary sectional view showing the application of the covering material to a suitable supporting structure.

Figure 5 is a sectional view showing a modified form of the invention, utilizing a staple, the legs of which do not completely penetrate the material to which it is applied.

Like reference characters indicate like parts throughout the several views.

The numeral 10 designates a fragment of covering material that is to be applied to a suitable supporting structure by a snap fastener, such as presently to be referred to. Said covering material may be the body of a finish panel for the interior of an automobile, or it may be a wall or ceiling covering of any kind. The invention is intended particularly for use in connection with securing trim panels to the interior of automobile bodies, and when used for this purpose the material 10 is a sheet of cardboard or other fibrous material, reinforced in any manner, as may be desired, or without reinforcement.

This invention aims to provide a ready means for attaching a multiplicity of snap fasteners at points along the covering material, preferably, adjacent to the edges thereof, at regularly spaced intervals along said edges.

Any snap fastener of the type that includes a head, that may be anchored with or without a capacity for lateral movement with respect to the covering material, and a shank having resilient holding and guiding elements, whereby the shank of the fastener may be forced into a socket or perforation in the supporting structure, may be utilized.

In the drawing, the invention is shown applied to a snap fastener of the type, that is shown in my Patent #1,679,266 granted July 31, 1928. Such a fastener, as described more in detail in said patent, comprises a head 11 formed by bending the mid-portion of a single piece of spring wire into the form of a loop. The portions of the wire adjacent the ends of said loop are then preferably brought inward toward the center of the loop providing arms 12 and 13. The ends of the wire are then turned into a plane substantially normal to the loop just referred to to form the shank of the fastener, which, in this instance is formed by bending said ends of the wire first so that they diverge from each other, as indicated at 14 and 15, providing divergent holding portions or legs. The ends of the fastener beyond said diverging portions are then bent inwardly toward each other to form converging guiding portions 16 and 17. The tips of the ends of the fastener are preferably disposed in overlapped relation, as indicated in Figure 2 of the drawing, so that the shank of the fastener may be readily entered into a socket or opening provided to receive it as hereinafter described.

The fastener just described lends itself admirably to the attachment to the body of covering material by means of a staple in a manner hereinafter described, and such means of attachment constitutes the essential part of the invention of this application.

The fastener is preferably applied to the covering material by means of a staple formed from a strip of sheet metal or from wire. Such a staple, as illustrated particularly in Figures 2 and 3, comprises a body portion 18 and legs 19 and 20, which are driven through the fibrous or similar material, constituting the body of the covering material 10. The tips of the legs 19 and 20 of the fastener may be turned inwardly or outwardly, and pressed into the body material as illustrated at 21 and 22.

The staple is positioned, as illustrated in Figure 3, so that the body 18 thereof, after the ends 21 and 22 have been pressed into the body of the material, is disposed in spaced relation to the inside of said covering material. Preferably, the space between the body 18 of the fastener and the rear side of the covering material is just sufficient to enable the head 11 of the snap fastener to be freely slid between the body of the staple and the rear side of the covering material. At the same time that the staple is driven the central portion of the body 18 is corrugated or crimped toward the inside of the covering material as shown at 23.

The assemblage of the head of the fastener beneath the body of the staple may be then readily brought about by bringing the central portion of the loop 11 opposite the staple, and by then bodily moving the fastener laterally to the position indicated in Figure 1 of the drawing. To accomplish this the loop constituting the head of the fastener is pressed through the space between the inside of the covering material and the corrugation 23, the body 18 of the staple being sufficiently resilient to enable this to be done. Said body must yield because the crest of the corrugation is spaced from the inside of the covering material an amount less than the thickness of the wire constituting the head of the fastener so that an interlocking is brought about between the fastener and staple after the head of the former is snapped in place. If desired, the body 18 of the staple may be crimped, by forming a relatively wide corrugation in the body thereof in which event the fastener is fixedly held in place without capability of movement in all lateral directions. The corrugation projects into the loop of the fastener and prevents it from being disassembled laterally of the staple in the manner in which it is applied thereto and thus brings about a permanent interlock between the staple and the fastener, whereby the latter is held in permanent assembly with respect to the covering material.

The width of the body 18 of the fastener is such, preferably, that it slightly exceeds the overall diameter of the head of the fastener, and the corrugation 23 is formed so as to be spaced from the loop so that the fastener can move slightly laterally, relative to the covering material after it has been assembled with respect thereto by the application of the staple as just described. This enables the fastener to be shifted laterally slightly so that when the covering material is applied to a supporting structure, the shank of the fastener may readily be brought into registry with an opening or socket designed to receive it, so that the opening or socket need not be exactly opposite the shank of the fastener. This greatly facilitates the attachment of the covering material to the supporting structure with fasteners that are in themselves capable of substantial lateral expansion and contraction. The type of fastener disclosed has a relatively wide capability of lateral expansion and contraction and accordingly can be attached to the covering material fixedly so that any slight errors in alinement can be compensated for in the contraction of the fastener.

One manner of application of the invention is illustrated in Figure 5 of the drawing, in which the numeral 24 designates a supporting structure, such as the door of an automobile body, for example. Such a supporting structure, which may be a part of the metallic framework of the door, is provided with openings 25, at intervals corresponding approximately to the spacing of the fasteners, as previously applied to the panel to be secured thereto. The snap fasteners of said panels are attached thereto in one of the of the ways above described, and the panel is then attached by forcing the shank of the fastener simultaneously into the openings 25 in the supporting structure designed to receive them.

The guiding portions 16 and 17 of the fasteners first enter said openings causing the legs of the shank to approach each other permitting the fastener to pass completely into the opening. When the fastener has entered the opening the diverging legs, which are made of spring material spread apart, drawing the material, to which the fastener is secured, firmly into contact with a yielding pressure against the supporting structure.

If desired, the panel may be covered with a fabric covering of any kind which may be wrapped around the edge 10 of the body of the panel, so as to be disposed between the inside of said body and the supporting structure in a manner, in itself, well known in the art.

When it is desired to secure snap fasteners to material having an outer ornamental surface of any kind, it is desirable to avoid complete penetration of the covering material or panel. In such situations, this invention contemplates proceeding as illustrated in Figure 5. As shown in this figure, a staple is illustrated, having a body 26 and attaching legs 27 and 28 the tips of which are curved as said legs are caused to enter the fibrous body material as indicated at 29 and 30. When a staple of this character is used it is attached to the fibrous body 31 without penetrating the ornamental covering 32 of any kind that is applied to the exposed outer surface of the panel or covering material. The body 26 is crimped or corrupated as shown at 26 for the purposes of the corrugation 23 above described.

The staples just described, may be applied by causing the legs to curve laterally as they are driven into the fibrous body material. Such staples may be applied by machine just as the staples previously described may be so applied. It will be readily understood that in either form of the invention the staples may be readily formed by the machine that positions them from a roll of material in known manner. An inherent characteristic of this invention, accordingly, is that the means for attaching the snap fasteners to covering material or panel may be applied by a machine, which forms as well as applies the staples. In constructions heretofore proposed, as above pointed out, it was customary to form the fastener holding elements of sheet metal that were formed in separate machines, before they could be applied to the panels or covering material in further machines designed especially to apply them.

In the form of the invention shown in Figure 5 the fastener is inserted in between the body 26 of the staple and the rear of the covering material or panel by inserting the loop-shaped head into said space and snapping said head between the corrugation and said material so as to bring about a permanent interlocking between the fastener and the staple.

It will be readily understood that staples such as described in this case may be used to secure snap fasteners of other kinds to covering material, and such constructions are contemplated as coming within the scope of the present invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:

1. In combination, material ready to be attached to a supporting structure, a snap fastener having a head and resilient holding elements projecting away therefrom, and a staple having legs and a securing portion connecting said legs, said portion being interlocked with the head of said fastener disposed so as to abut against said material opposite said portion and said legs being driven in said material.

2. In combination, unperforated material ready to be attached to a supporting structure, a snap fastener of the one-piece wire type having a head in the form of a loop disposed so as to abut against said material and resilient holding portions projecting therefrom, and a staple having legs and a securing portion extending across a part of said head and connecting said legs, said portion being bent into interlocked relation with said loop constituting the head of said fastener, and said legs being driven in said material.

3. In combination, unperforated material ready to be attached to a supporting structure, a snap fastener of the one-piece wire type having a head in the form of a loop and resilient holding elements projecting away therefrom, and a staple having legs and a securing portion connecting said legs, said portion being crimped so as to interlock it with the loop constituting the head of said fastener, and said legs being driven in said material.

4. In combination, material ready to be attached to a supporting structure, a snap fastener of the one-piece wire type having a head in the form of a loop disposed so that said head abuts against a side of the material and resilient holding portions projecting away therefrom and a one-piece staple having legs and a securing portion connecting said legs, said portion extending across a part of said head and being interlocked with the loop constituting the head of said fastener so that the head of the fastener is free to move bodily in all lateral directions, and said legs being driven in said material.

5. In combination, material ready to be attached to a supporting structure, a relatively narrow elongated sheet metal securing element having its ends driven in said material and the part thereof between said ends disposed in spaced relation to an unperforated portion of said material, and a headed fastener having its head abutting against said portion of said material and having a portion of its head disposed between said part and said portion of said material.

6. In combination, material ready to be attached to a supporting structure, a relatively narrow elongated sheet metal securing element having its ends driven in said material and the part thereof between said ends disposed in spaced relation to said material, and a headed one-piece wire fastener having its head formed by bending a portion of the wire into the form of a loop, said head being disposed between said part and abutting against said material, said part being bent into said loop so as to interlock the fastener with respect to said securing element.

7. In combination, material ready to be attached to a supporting structure, said material constituting a fibrous body and an ornamental outer surface, a relatively narrow elongated sheet metal securing element having its ends driven in said material from the inside thereof in a manner so that said ends do not penetrate said ornamental outer surface, the part of said securing element between its ends being disposed in spaced relation to said material, a headed fastener having a portion of its head disposed between said part and abutting against the inside of said material, and means to interlock said head and said securing element in a manner so that said fastener may move laterally with respect to said securing element.

8. The method of assembling a headed snap fastener to material prior to the application of the material to a supporting structure which consists in driving a staple into said material in a manner so that parts thereof between the legs of the staple are spaced from said material, inserting the head of the fastener beneath said parts by lateral movement thereof and then applying the fastener and material to the supporting structure.

9. The method of securing a headed snap fastener to material which consists in applying a staple to said material by driving the legs thereof into the material in a manner so that parts of the staple between said legs are spaced from the material, crimping another part of said staple between the legs thereof, and then bringing about an interlocking action between the head of the fastener and said crimped part of the staple.

10. The method of applying a headed snap fastener to material having an ornamental outer surface, which consists in driving a staple into said material so that the legs thereof will not penetrate said ornamental outer surface and so that parts of the staple between said legs are spaced from the inner surface of said material, crimping another part of the staple between said legs, and inserting the head of the fastener laterally beneath said parts of the staple so that said crimped part interlocks with said head.

11. The method of assembling headed snap fasteners to material intended to be secured thereby prior to the application of the material and fasteners to the supporting structure, which consists in applying a fastener holding element having substantial resilience to said material so that parts thereof are spaced from one side of said material, and passing the head of the fastener laterally beneath said resilient holding material so as to bring about an interlocking between said holding material and the head of said fastener.

12. A material and snap fastener combination ready to be attached to a supporting structure by causing the shank of the headed fastener non-removably attached to the material to be sprung into a socket in the supporting structure, consisting of the material, the fastener and means to secure the fastener to the material prior to the attachment thereof to said structure, said last named means comprising an elongated narrow strip of metal the mid portion of which laps and is interlocked with the head of the fastener and the ends of which are driven and embedded in the material.

In testimony whereof I affix my signature.

BION C. PLACE.